United States Patent
Meurer et al.

(10) Patent No.: US 11,499,358 B2
(45) Date of Patent: Nov. 15, 2022

(54) DOOR DRIVE FOR A DOOR, IN PARTICULAR OF A PIECE OF FURNITURE OR AN APPLIANCE, METHOD FOR OPERATING SUCH A DOOR DRIVE AS WELL AS DEVICE WITH AT LEAST ONE SUCH DOOR DRIVE

(71) Applicant: APPARATEBAU GRONBACH S.R.L., Laag/Neumarkt (IT)

(72) Inventors: Gerold Meurer, Margreid an der Weinstrasse (IT); Massimiliano Margonari, Trento (IT)

(73) Assignee: APPARATEBAU GRONBACH S.R.L., Laag/Neumarkt (IT)

( * ) Notice: Subject to any disclaimer, the term of this patent is extended or adjusted under 35 U.S.C. 154(b) by 204 days.

(21) Appl. No.: 16/920,944

(22) Filed: Jul. 6, 2020

(65) Prior Publication Data
US 2021/0017801 A1 Jan. 21, 2021

(30) Foreign Application Priority Data
Jul. 15, 2019 (EP) .................................... 19425052

(51) Int. Cl.
*E05F 15/622* (2015.01)
*F16D 11/04* (2006.01)
*F16D 23/12* (2006.01)

(52) U.S. Cl.
CPC ............ *E05F 15/622* (2015.01); *F16D 11/04* (2013.01); *E05Y 2201/216* (2013.01);
(Continued)

(58) Field of Classification Search
None
See application file for complete search history.

(56) References Cited

U.S. PATENT DOCUMENTS

| | | | | |
|---|---|---|---|---|
| 3,690,427 A | * | 9/1972 | Zimmerman | ........... F16D 11/04 192/24 |
| 2008/0271552 A1 | * | 11/2008 | Arenz | ................... E05F 15/622 74/89.23 |

(Continued)

FOREIGN PATENT DOCUMENTS

| CN | 106761141 A | 5/2017 |
|---|---|---|
| CN | 109386197 A | 2/2019 |

(Continued)

OTHER PUBLICATIONS

EPO; App. No. 19425052.8; Examination Search Report dated Dec. 18, 2019.
(Continued)

*Primary Examiner* — Timothy Hannon
(74) *Attorney, Agent, or Firm* — Fitch, Even, Tabin & Flannery, LLP (57) ABSTRACT

In one form, the invention relates to a door drive for a door, the door drive comprising: a drive motor, a drive shaft drivable and thereby rotatable by the drive motor, a clutch, and a threaded spindle which is drivable and thereby rotatable by the drive shaft via the clutch, wherein the clutch comprises: a catch element, an actuating element which, by rotating the drive shaft, is drivable and thereby rotatable around an actuation rotational axis by the drive shaft, the actuating element comprising at least one first actuation area, and a clutch element which comprises at least one second actuation area corresponding to the first actuation area, wherein the clutch element is translationally movable along the actuation rotational axis relative to the catch element between at least one decoupling position in which the clutch element is decoupled from the catch element, and at least one coupling position in which the clutch element is coupled to the catch element, and wherein a relative rotation between the actuating element and the clutch element, the (Continued)

relative rotation being effectable by rotating the drive shaft, can be converted, by means of the actuation areas, into a translational movement of the clutch element from the decoupling position into the coupling position, the translational movement taking place along the actuation rotational axis, relative to the catch element, relative to the actuating element and in the direction of the catch element.

15 Claims, 4 Drawing Sheets

(52) U.S. Cl.
CPC ..... *E05Y 2201/638* (2013.01); *E05Y 2900/31* (2013.01); *F16D 2023/123* (2013.01)

(56) References Cited

U.S. PATENT DOCUMENTS

2017/0204661 A1* 7/2017 Dann ................ E06B 9/74
2017/0239683 A1* 8/2017 Schultheiss ......... B05C 17/0103
2019/0040670 A1 2/2019 Dora
2019/0242171 A1 8/2019 Wittelsbuerger et al.

FOREIGN PATENT DOCUMENTS

| DE | 102016113353 A1 | 1/2018 | | |
|----|----|----|----|----|
| DE | 102016116876 A1 | 3/2018 | | |
| EP | 2148035 A2 | 1/2010 | | |
| JP | 60095228 A | * | 5/1985 | ............ F16D 69/00 |

OTHER PUBLICATIONS

CNIPO; App. No. 202010681035.1; First Examination Report and Search Report dated Sep. 3, 2021.

* cited by examiner

DOOR DRIVE FOR A DOOR, IN PARTICULAR OF A PIECE OF FURNITURE OR AN APPLIANCE, METHOD FOR OPERATING SUCH A DOOR DRIVE AS WELL AS DEVICE WITH AT LEAST ONE SUCH DOOR DRIVE

CROSS-REFERENCE TO RELATED APPLICATION

This application claims priority to European Patent Application No. 19425052.8, filed Jul. 15, 2019, which is incorporated by reference in its entirety herein.

FIELD

The invention relates to a door drive according to the preamble of claim 1, to a method for operating such a door drive according to the preamble of claim 13 and to a device with at least one such door drive.

BACKGROUND

EP 2 148 035 A2 discloses an arrangement with a housing, in particular of a refrigerating and/or freezing appliance. Further, the arrangement includes a door pivotably hinged to the housing around a pivot axis of a hinge and at least one drive device for pivoting the door with respect to the housing. Therein, the drive device includes a drive unit, by means of which a torque can be exerted on the door with respect to the hinge axis via at least one force transmission means.

SUMMARY

It is an object of the present invention to provide a door drive for a door, in particular a method for operating such a door drive as well as a device such that the door can be moved in particularly advantageous manner.

According to the invention, this object is solved by a door drive comprising the features of claim 1, by a method comprising the features of claim 13 as well as by a device comprising the features of claim 15. Advantageous configurations with convenient developments of the invention are specified in the remaining claims.

A first aspect of the invention relates to a door drive for a door, in particular of a piece of furniture or an, in particular electrical or electronic, appliance. Preferably, the appliance is a refrigerating and/or freezing appliance. This means that the appliance or the piece of furniture, in its completely fabricated state, comprises a housing element for example also referred to as corpus and the previously mentioned door, which is movably, in particular pivotably, retained on the housing element, in particular via at least one hinge, and is thus pivotable in relation to the housing element, while the door is connected to the housing element, in particular via the hinge. Therein, the door drive is used or usable to move, in particular pivot, the door in relation to the housing element. In particular, the door can for example be opened and/or closed by means of the door drive. The appliance and the piece of furniture are also referred to as devices or are respective devices in summary. The door drive comprises a drive motor, which is preferably formed as an electric motor and thus is operable in electrical manner or by means of electrical energy or electrical current. The door drive additionally comprises a drive shaft drivable by the drive motor and thereby rotatable, in particular around a shaft rotational axis. The drive motor for example comprises a stator and a rotor drivable by the stator and thereby rotatable in relation to the stator around a motor rotational axis, wherein the shaft is for example drivable by the rotor. For example, the shaft is a constituent of the rotor or rotationally fixedly connected to the rotor. For example, the shaft is arranged coaxially to the rotor such that the motor rotational axis and the shaft rotational axis coincide.

In addition, the door drive comprises a clutch and a threaded spindle, which is drivable by the drive shaft via the clutch and thereby rotatable, in particular around a spindle rotational axis. Preferably, the threaded spindle also simply referred to as spindle is arranged coaxially to the shaft such that the spindle rotational axis coincides with the shaft rotational axis. Alternatively or additionally, the spindle is preferably arranged coaxially to the drive motor or the rotor such that the spindle rotational axis for example coincides with the motor rotational axis.

The drive shaft, the threaded spindle as well as optionally the rotor are for example rotatable in relation to a housing of the door drive. The housing of the door drive can be the housing element of the device or the housing is a housing formed separately from the housing element and provided in addition thereto, which can for example be at least indirectly, in particular directly, attached, in particular fixed, to the housing element. The threaded spindle for example comprises a first thread, in particular in the form of an external thread. Therein, a screw element is for example provided, which for example comprises a second thread corresponding to the first thread and for example formed as an internal thread. The screw element is for example a nut and can be screwed onto the threaded spindle.

Therein, the door is drivable via the threaded spindle and thereby movable in relation to the housing element. For example, if the threaded spindle is rotated, in particular by means of the drive motor via the clutch, in relation to the screw element, thus, the first thread and the second thread convert the relative rotation between the threaded spindle and the screw element into a translational movement of the screw element, the translational movement of which is effected along the threaded spindle and therein in particular along the spindle rotational axis and in relation to the housing. Hereto, the screw element is for example secured against a rotation taking place around the spindle rotational axis and in relation to the housing or such a rotation of the screw element around the spindle rotational axis in relation to the housing is at least limited such that if the threaded spindle is rotated around the spindle rotational axis, the screw element is not rotated together with the threaded spindle, but a relative rotation between the threaded spindle and the screw element takes place. As a result, the screw element is shifted along the threaded spindle and in particular in relation to the housing, whereby the door is for example movable in relation to the housing element. Thus, the door can for example be driven by the threaded spindle via the screw element and moved, in particular pivoted, in relation to the housing element.

Now, in order to be able to couple the door or the screw element functioning as the transmitting element to the drive motor and to decouple it from the drive motor in particularly advantageous and adequate manner and thus to be able to move the door in particularly advantageous manner, it is provided according to the invention that the clutch comprises a catch element for example formed as a catch disk. In addition, the clutch comprises an actuating element, which is drivable by the drive shaft by rotating the drive shaft and thereby rotatable around an actuation rotational axis, in particular in relation to the housing. Preferably, the actuating element is arranged coaxially to the drive shaft such that the actuation rotational axis coincides with the shaft rotational axis. Therein, the actuating element comprises at least one first actuation area.

In addition, the clutch comprises a clutch element, which can for example be formed as a clutch disk. The clutch element comprises at least one second actuation area corresponding to the first actuation area and is translationally movable, that is shiftable, between at least a decoupling position and at least a coupling position along the actuation rotational axis in relation to the catch element and in particular in relation to the housing. In the decoupling position, the clutch element is decoupled from the catch element such that torques cannot be transmitted between the clutch element and the catch element in the decoupling position. For example, the clutch element is, in particular completely, spaced from the catch element in the decoupling position, in particular at least along the actuation rotational axis. In the coupling position, the clutch element is coupled to the catch element, in particular in torque transmitting manner, such that torques can be transmitted between the clutch element and the catch element in the coupling position.

Thus, if the clutch element is for example in the coupling position and if the clutch element is for example driven by the drive shaft in the coupling position and thereby for example rotated around the actuation rotational axis, thus, the clutch element entrains the catch element such that the catch element is then also rotated, in particular around the actuation rotational axis, in particular in relation to the housing.

By means of the actuation areas, a relative rotation between the actuating element and the clutch element capable of being effected or effected by rotating the drive shaft and for example taking place around the actuation rotational axis can be converted into a translational movement of the clutch element from the decoupling position into the coupling position taking place along the actuation rotational axis, in relation to the catch element, in relation to the actuating element and preferably in relation to the housing and in the direction of the catch element. In other words, if the actuating element is for example driven by the drive shaft and hereby rotated around the actuation rotational axis in relation to the housing and in particular in relation to the clutch element, while the clutch element is still in the decoupling position, thus, this relative rotation between the clutch element and the actuating element is converted into such a movement of the clutch element by means of the actuation areas, which shifts along the actuation rotational axis in relation to the actuating element, in relation to the catch element and in relation to the housing along the actuation rotational axis within the scope of the previously mentioned movement and therein shifts towards the catch element such that the clutch element moves or shifts from the decoupling position into the coupling position and is being coupled or is coupled to the catch element in torque transmitting manner as a result. If then, that is after reaching the coupling position by the clutch element, the actuating element is for example further rotated around the actuation rotational axis in relation to the housing, thus, the clutch element is hereby rotated in relation to the housing, in particular around the actuation rotational axis. Since the clutch element is therein in the coupling position, the clutch element entrains the catch element, whereby the catch element is rotated by the clutch element in relation to the housing, in particular around the actuation rotational axis.

The catch element in turn at least indirectly, in particular directly, entrains the threaded spindle such that the threaded spindle is rotated around the spindle rotational axis in relation to the housing. Hereto, the catch element is for example connected to the threaded spindle in torque transmitting manner, in particular rotationally fixedly connected to the threaded spindle.

In the coupling position, a force or torque transmission path between the threaded spindle, in particular the door, and the drive motor is closed, in particular via the clutch, such that forces or torques can for example be transmitted between the threaded spindle or the door and the drive motor via the force or torque transmission path. However, in the decoupling position, the force or torque transmission path is interrupted, in particular by the clutch, such that forces or torques cannot be transmitted between the threaded spindle or the door and the drive motor in the decoupling position. As a result, it is for example possible that the door is manually moved, in particular pivoted, in relation to the housing by a person in the decoupled state without the drive motor or the rotor thereof herein being driven by the door. For example, if the door is manually moved in relation to the housing element by a person, while the clutch element is in the decoupling position, thus, the screw element is then for example translationally moved in relation to the housing, whereby the threaded spindle is for example rotated around the spindle rotational axis in relation to the housing. However, since the clutch element is in the decoupling position therein, the drive shaft and the rotor are not driven and thus not rotated in relation to the housing. As a result, the person can manually move the door in particularly simple manner.

Since it is provided according to the invention to convert a relative rotation between the actuating element and the clutch element into the previously described movement of the clutch element from the decoupling position into the coupling position by means of the actuation areas, and since the relative rotation between the actuating element and the clutch element is effected or can be effected by means of the drive motor, it is provided according to the invention to use one and the same drive motor, in particular one and the same rotor, both for rotating the threaded spindle and thus for moving the door and for moving the clutch element from the decoupling position into the coupling position. As a result, an actuator different from the drive motor, provided in addition to the drive motor, for moving the clutch element from the decoupling position into the coupling position can be avoided such that the number of parts and thus the cost, the installation space demand and the weight of the door drive can be kept low. Thus, it is preferably provided that the door drive according to the invention is free of an actuator provided in addition to the drive motor and formed for moving the clutch element from the decoupling position into the coupling position.

In advantageous configuration of the invention, the clutch element located in the coupling position is drivable by rotating the actuating element and thereby rotatable together with the actuating element, wherein the catch element is drivable and the threaded spindle is drivable by the catch element via the catch element and thereby rotatable by rotating the clutch element located in the coupling position. The clutch element located in coupling position is for example driven by the actuating element and in particular rotated around the actuation rotational axis in relation to the housing in that the clutch element located in the coupling position is secured against a further shift starting from the coupling position, taking place along the actuation rotational axis and in relation to the housing and pointing away from the actuating element. In other words, the actuation areas quasi effect that upon a relative rotation between the actuating element and the clutch element, the clutch element first located in the decoupling position quasi evades the actuating element or the rotation thereof and shifts away from the actuating element along the actuation rotational axis hereto and shifts towards the catch element, wherein this shift of the clutch element away from the actuating element and towards the catch element is allowed or effected until the clutch element reaches the coupling position. In the coupling position, the clutch element is secured against a further shift away from the actuating element taking place along the actuation rotational axis, in particular by means of the catch element, such that the clutch element is rotated by means of the actuating element, in particular around the actuation rotational axis in relation to the housing, by further rotating the actuating element. As a result, the clutch element entrains the catch element, whereby the catch element and consequently the threaded spindle are rotated in relation to the housing.

Therein, it has proven particularly advantageous if the actuation areas extend in a respective plane, which extends obliquely to the actuation rotational axis. Hereby, a torque extending around the rotational axis, by means of which for example the actuating element is rotated in relation to the clutch element first located in the decoupling position, or a force causing the torque is for example divided or decomposed such that a force component results from the torque or from the force, the direction of action of which extends parallel to the actuation rotational axis or coincides with the actuation rotational axis and in particular points away from the actuating element and in the direction of the catch element. By this force component, the translational movement of the clutch element from the decoupling position into the coupling position along the actuation rotational axis is finally effected. In the coupling position, the clutch element is for example at least indirectly, in particular directly, supported on the catch element in a support direction for example extending parallel to the actuation rotational axis and pointing from the actuating element to the catch element and thereby secured against a further shift away from the actuating element taking place into the support direction.

For example, the actuation areas, in particular directly, slide on each other upon the relative rotation between the actuating element and the clutch element and upon the translational movement of the clutch element from the decoupling position into the coupling position effected thereby. In particular, the actuation areas cause that a shift of the clutch element from the decoupling position into the coupling position is superimposed on the relative rotation between the actuating element and the clutch element such that the same drive motor, in particular the same rotor of the drive motor, can be used to both move the clutch element from the decoupling position into the coupling position and to rotate the threaded spindle and consequently to move the door.

A further embodiment is characterized in that the actuation areas mutually overlap in circumferential direction extending around the actuation rotational axis in the decoupling position. Hereby, the actuating element does not have to be first separately shifted to move the shift of the clutch element from the decoupling position into the coupling position by rotating the actuating element in relation to the clutch element, but the actuating element can be simply only rotated by means of the rotor to move the clutch element from the decoupling position into the coupling position. In this manner, the clutch element can be translationally moved from the decoupling position into the coupling position without shifting the actuating element in relation to the housing. Thus, additional actuators can be avoided such that the number of parts and thus the weight, the cost and the installation space demand of the door drive can be kept particularly low.

In a particularly advantageous embodiment of the invention, one of the actuation areas, in particular the second actuation area, at least partially bounds a receptacle, with which the other actuation area, in particular the first actuation area, engages at least in the decoupling position. Thereby, the installation space demand of the door drive can be kept particularly low in particular in axial direction of the door drive on the one hand. On the other hand, the actuating element does not have to be first shifted in relation to the housing to be brought in cooperation with the clutch element, but the actuating element can be simply rotated around the actuation rotational axis without shifting it to thereby immediately effect the shift of the clutch element.

It has further proven particularly advantageous if at least one spring element preferably formed as a mechanical spring is provided, which can be tensioned by moving the clutch element from the decoupling position into the coupling position and thereby provides a spring force at least indirectly acting on the clutch element and for example along the actuation rotational axis at least in the coupling position, by means of which a movement of the clutch element from the coupling position into the decoupling position can be effected. Hereby, the clutch element can be moved from the coupling position back into the decoupling position in particularly simple manner and thus beneficial in terms of installation space, weight and cost.

In further advantageous configuration of the invention, the clutch element is rotatable in relation to the housing and translationally movable, that is shiftable, between the coupling position and the decoupling position in relation to the housing. Therein, at least one brake element formed separately from the clutch element and preferably separately from the housing is provided, by means of which the clutch element can be braked or is braked against the housing at least with respect to the rotation thereof taking place in relation to the housing. Hereby, it can be ensured that if the clutch element is in the decoupling position and the actuating element is driven by the drive motor and thus rotated around the actuation rotational axis in relation to the housing, in particular until the clutch element is not yet in the coupling position, a relative rotation between the actuating element and the clutch element occurs, such that consequently the clutch element is shifted from the decoupling position into the coupling position in the described manner. In other words, the brake element ensures the desired relative rotation between the actuating element and the clutch element effecting the movement of the clutch element from the decoupling position into the coupling position. In particular, this embodiment is based on the realization that for example upon employment of a transmission, via which the drive shaft is driven by the drive motor, and in particular if the transmission has a large gear ratio, such adverse inertial conditions can occur that for example if the clutch element is not braked by means of the brake element with respect to the housing and with respect to a rotation taking place in relation to the housing, the clutch element located in the decoupling position is rotated together with the actuating element without a relative rotation between the actuating element and the clutch element located in the decoupling position occurring and thus without the clutch element located in the decoupling position being shifted into the coupling position. Overall, it is apparent that by the use of the brake element, a desired relative rotation between the actuating element and the clutch element located in the decoupling position and the shift of the clutch element from the decoupling position into the coupling position resulting from it can be ensured even if a transmission having a high gear ratio is employed, via which the drive shaft is driven by the rotor.

In order to realize a particularly advantageous brake effect, it is provided in a configuration of the invention that at least one first surface of the brake element directly contacts at least one second surface of the clutch element. By the feature that the clutch element can be braked against the housing at least with respect to the rotation thereof taking place in relation to the housing by means of the brake element, it is to be understood that the brake element does not completely avoid, but allows a rotation of the clutch element taking place in relation to the housing and in particular around the actuation rotational axis and only is opposed to such a relative rotation between the clutch element and the housing.

It has proven particularly advantageous if the surfaces extend in a respective plane extending obliquely to the actuation rotational axis. In other words, a first one of the surfaces for example extends in a first plane and the second surface extends in a second plane, wherein the planes extend obliquely to the actuation rotational axis. Preferably, the planes extend parallel to each other. Thus, the respective surface is for example a wedge, a cone, wedge-shaped or conical. In other words, it is preferably provided that the surfaces are formed conically or in the shape of a conical segment such that the respective surface is for example formed by a respective cone, in particular by a respective friction cone. Therein, the clutch element can be braked with respect to the housing with respect to the rotation thereof taking place in relation to the housing and for example around the actuation rotational axis by means of the friction cones. By the feature that the respective surface extends in a respective plane extending obliquely to the actuation rotational axis, it can also be understood that for example if the respective surface is conically formed, a plane tangent to the respective surface extends obliquely to the actuation rotational axis.

It was found that by braking the clutch element with respect to the housing by means of the described friction cones, the clutch element can be advantageously braked with respect to the rotation thereof taking place in relation to the housing in order to ensure a relative rotation between the actuating element and the clutch element effecting the shift of the clutch element from the decoupling position into the coupling position. However, an excessive, undesired deceleration of the clutch element with respect to the shift thereof from the decoupling position into the coupling position taking place in relation to the housing, can be avoided by using the friction cones. Thus, it can be ensured that the clutch element is sufficiently braked on the one hand to ensure a relative rotation between the actuating element and the clutch element. However, an excessive deceleration of the clutch element along the actuation rotational axis can be avoided.

Preferably, the brake element is shiftable together with the clutch element in relation to the housing. For example, the brake element is coupled to the housing or retained on the housing via a spring for example formed as a leaf spring, which is preferably a mechanical spring. By means of the spring, the surface of the brake element is for example retained in, in particular direct, support abutment on the surface of the clutch element. For example, the brake element is shiftable along the spring in relation to the housing together with the clutch element. Upon relative shifts between the clutch element and the housing and thus between the brake element and the housing taking place along the actuation rotational axis in relation to the housing, for example the brake element slides along the spring and/or on the spring. Thus, the spring for example functions as a guide, by means of which the brake element can be guided or is guided upon shifts taking place along the actuation rotational axis and in relation to the housing. Alternatively or additionally, the brake element is for example secured against rotations taking place in relation to the housing and around the actuation rotational axis by means of the spring.

A further embodiment is characterized in that one of the surfaces at least partially bounds a recess, with which the other surface engages. Thereby, a particularly advantageous deceleration of the clutch element can be ensured.

In a particularly advantageous embodiment of the invention, it is provided that the brake element is formed of a first material, in particular of a plastic and preferably of a fiber-reinforced plastic, and the clutch element is formed of a second material different from the first material, in particular of a metallic material. Hereby, a particularly advantageous deceleration of the clutch element can be ensured.

A further embodiment is characterized in that the clutch element and the catch element cooperate in form-fit and/or force-fit manner in the coupling position and thereby are coupled to each other, in particular in torque transmitting manner. Thereby, it can be ensured that the clutch element securely entrains the catch element.

A second aspect of the invention relates to a method for operating a door drive, in particular according to the first aspect of the invention, for a door. In the method, the door is driven by means of the drive and thereby moved from a first position into a second position different from the first position in relation to a housing element. The door drive comprises a drive motor and a drive shaft, which is driven by the drive motor and thereby rotated upon driving the door. The door drive additionally comprises a clutch and a threaded spindle, which is driven by the drive shaft via the clutch and thereby rotated upon driving the door, whereby the door is driven by the motor via the threaded spindle, the clutch and the drive shaft.

In order to be able to particularly advantageously move the door, it is provided according to the invention that the clutch comprises a catch element and an actuating element, which is driven by the drive shaft by rotating the drive shaft and thereby rotated around an actuation rotational axis and comprises at least one first actuation area. The clutch additionally comprises a clutch element, which comprises at least one second actuation area corresponding to the first actuation area and is translationally movable along the actuation rotational axis in relation to the catch element between at least a decoupling position, in which the clutch element is decoupled from the catch element, and at least a coupling position, in which the clutch element is coupled to the catch element. By means of the actuation areas, a relative rotation between the actuating element and the clutch element effected by rotating the drive shaft is converted into a translational movement of the clutch element from the decoupling position into the coupling position effected along the actuation rotational axis, in relation to the catch element, in relation to the actuating element and in the direction of the catch element. Advantages and advantageous configurations of the first aspect of the invention are to be regarded as advantages and advantageous configurations of the second aspect of the invention and vice versa.

For example, in order to allow a movement of the clutch element from the coupling position back into the decoupling position in particular effected or capable of being effected by means of the above mentioned spring element in simple and inexpensive manner, it is provided in advantageous configuration of the invention that for moving the door into the second position, the actuating element is rotated in a first rotational direction, in particular in relation to the housing, by means of the drive motor via the drive shaft. After moving the door into the second position, the actuating element is, in particular automatically, rotated back a bit in a second rotational direction opposite to the first rotational direction, in particular in relation to the housing, by means of the drive motor via the drive shaft such that a movement of the door from the second position is omitted or the door is moved into an intermediate position located between the first position and the second position and closer to the second position than to the first position. Thus, rotating back the actuating element is automatically effected and at least nearly without moving the door such that the door at least nearly remains in the second position, but the spring element can move back, in particular rotate back, the clutch element from the coupling position into the decoupling position. Thereby, a particularly advantageous movability of the door can be ensured.

A third aspect of the invention relates to a device with a housing element, with a door hingedly retained on the housing element and movable, in particular pivotable, in relation to the housing element, and with at least one door drive according to the invention according to the first aspect of the invention, wherein the door is drivable by means of the door drive and thereby movable in relation to the housing. Advantages and advantageous configurations of the first and the second aspect of the invention are to be regarded as advantages and advantageous configurations of the third aspect of the invention and vice versa. As previously indicated, the device is for example the previously mentioned appliance or the previously mentioned piece of furniture.

Further advantages, features and details of the invention are apparent from the following description of a preferred embodiment as well as based on the drawing. The features and feature combinations mentioned above in the description as well as the features and feature combinations mentioned below in the description of figures and/or shown in the figures alone are usable not only in the respectively specified combination, but also in other combinations or alone without departing from the scope of the invention.

BRIEF DESCRIPTION OF THE DRAWINGS

The drawings illustrate the following.

In the Figures, identical or functionally identical elements are provided with identical reference characters.

DESCRIPTION OF THE PREFERRED EMBODIMENTS

Figure 1:
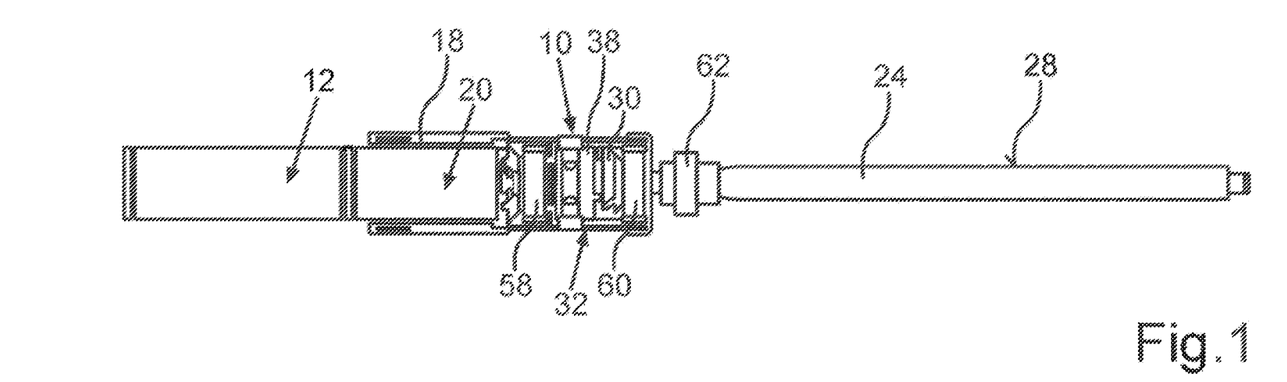
FIG. 1 shows a schematic and partially sectioned side view of a door drive according to the invention according to a first embodiment for a door.

FIG. 1 shows a door drive 10 for a door of a device in a schematic and partially sectioned side view. This means that the device, in its completely fabricated state, comprises a housing element for example also referred to as corpus and the mentioned door, which is for example hinged to the housing element by at least one hinge and thus hingedly retained on the housing element. Thus, the door can be moved, in particular rotated, in relation to the housing element, while the door is connected to the housing element. Therein, the door is movable between a first position and a second position in relation to the housing. For example, the housing element comprises an opening in particular formed as a passage opening. The first position is for example a closed position, in which at least a partial area of the opening is covered and thus closed by means of the door. The second position is for example an open position, in which the door releases at least the partial area. Therein, the door can be moved in relation to the housing element by means of the door drive 10, in particular using electrical energy. In particular, the door can be moved from the first position into the second position in relation to the housing element by means of the door drive 10.

Figure 2:
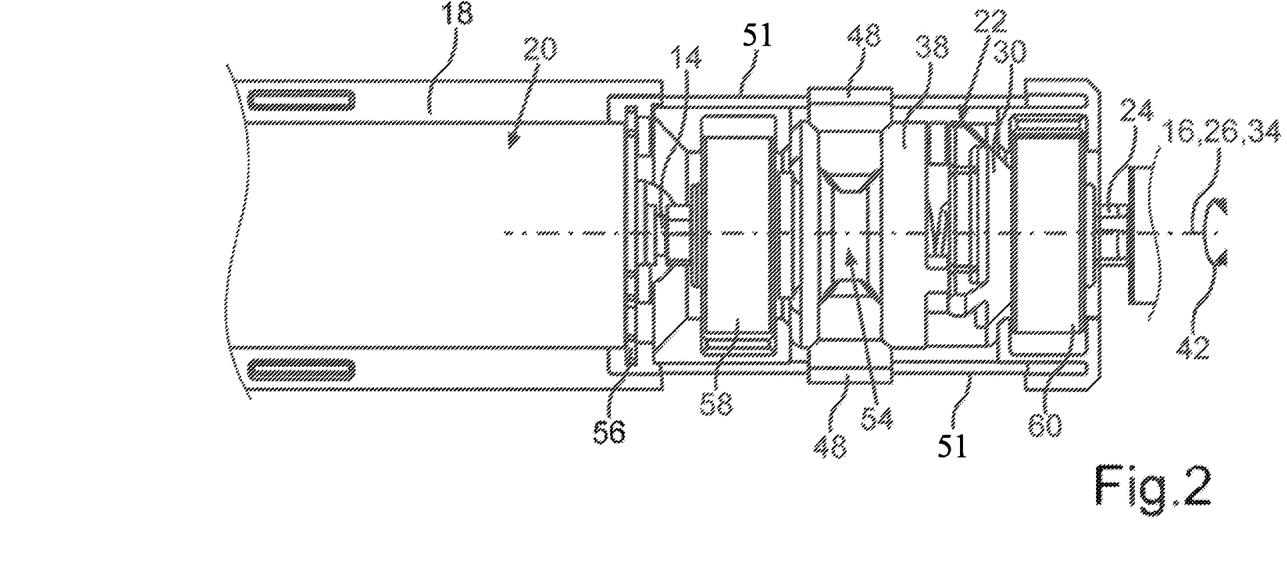
FIG. 2 shows partially a schematic and partially sectioned side view of the door drive.

Hereto, the door drive 10 comprises a drive motor 12 preferably formed as an electric motor and a drive shaft 14 drivable by the drive motor 12 and particularly well apparent from FIG. 2, which is drivable by the drive motor 12 and thereby rotatable around a shaft rotational axis 16 in relation to the housing element. Therein, the door drive 10 comprises a housing 18, in which the drive shaft 14 can be at least partially received. Therein, the drive shaft 14 is rotatable around the shaft rotational axis 16 in relation to the housing 18. A transmission 20 is for example associated with the drive motor 12, via which the drive shaft 14 can be driven by the drive motor 12. Moreover, the door drive 10 comprises a clutch 22 and a threaded spindle 24, which is drivable by the drive shaft 14 via the clutch 22 and thereby rotatable around a spindle rotational axis 26 in relation to the housing 18. FIGS. 1 to 4 show a first embodiment, in which the spindle rotational axis 26 coincides with the shaft rotational axis 16. Therein, the door can be driven by means of the drive motor 12 via the threaded spindle 24 and thus moved in relation to the housing element. Hereto, the threaded spindle 24 comprises a first thread 28 in the form of an external thread.

In completely fabricated state of the device, a screw element in the form of a spindle nut is for example provided, which is also simply referred to as nut. The spindle nut comprises a second thread corresponding to the thread 28 and formed as an internal thread, wherein the threaded nut is screwed with the threaded spindle 24 via the threads. For example, the door is at least indirectly and/or hingedly coupled to the spindle nut. In addition, the spindle nut is for example secured against a rotation taking place in relation to the housing 18. Thus, if the threaded spindle 24 is driven by the drive motor 12 and thus rotated around the spindle rotational axis 26 in relation to the housing 18, thus, the threaded spindle 24 is thereby also rotated in relation to the spindle nut. Since the spindle nut is secured against rotations taking place in relation to the housing 18 and around the spindle rotational axis 26, the spindle nut does not rotate together with the threaded spindle 24, but the spindle nut is translationally moved, that is shifted, in particular according to rotational direction of the threaded spindle 24, along the spindle rotational axis 26 in relation to the housing 18. Hereby, the door is moved, in particular pivoted, in relation to the housing element.

Figure 3:
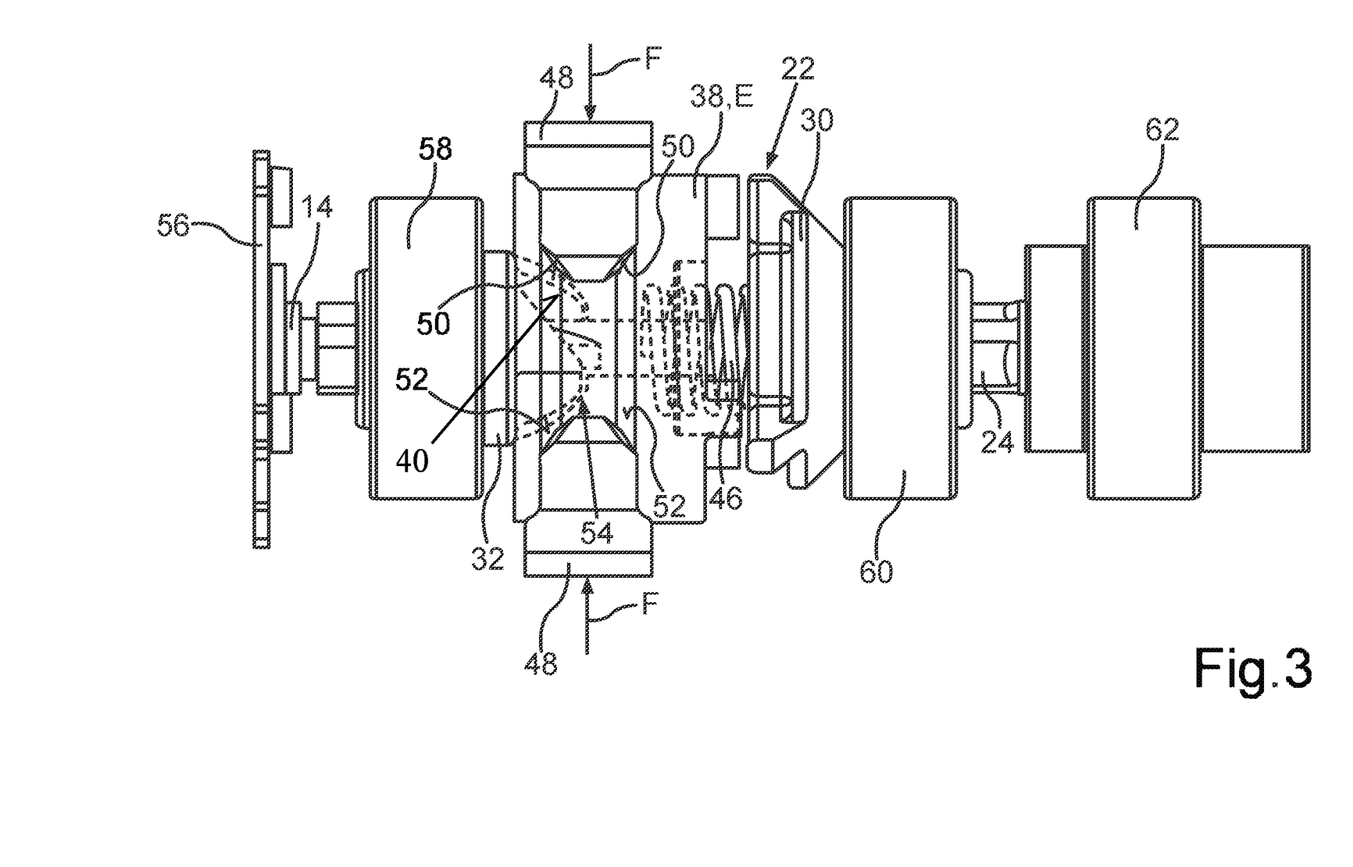
FIG. 3 shows partially a schematic side view of the door drive.
Figure 4:
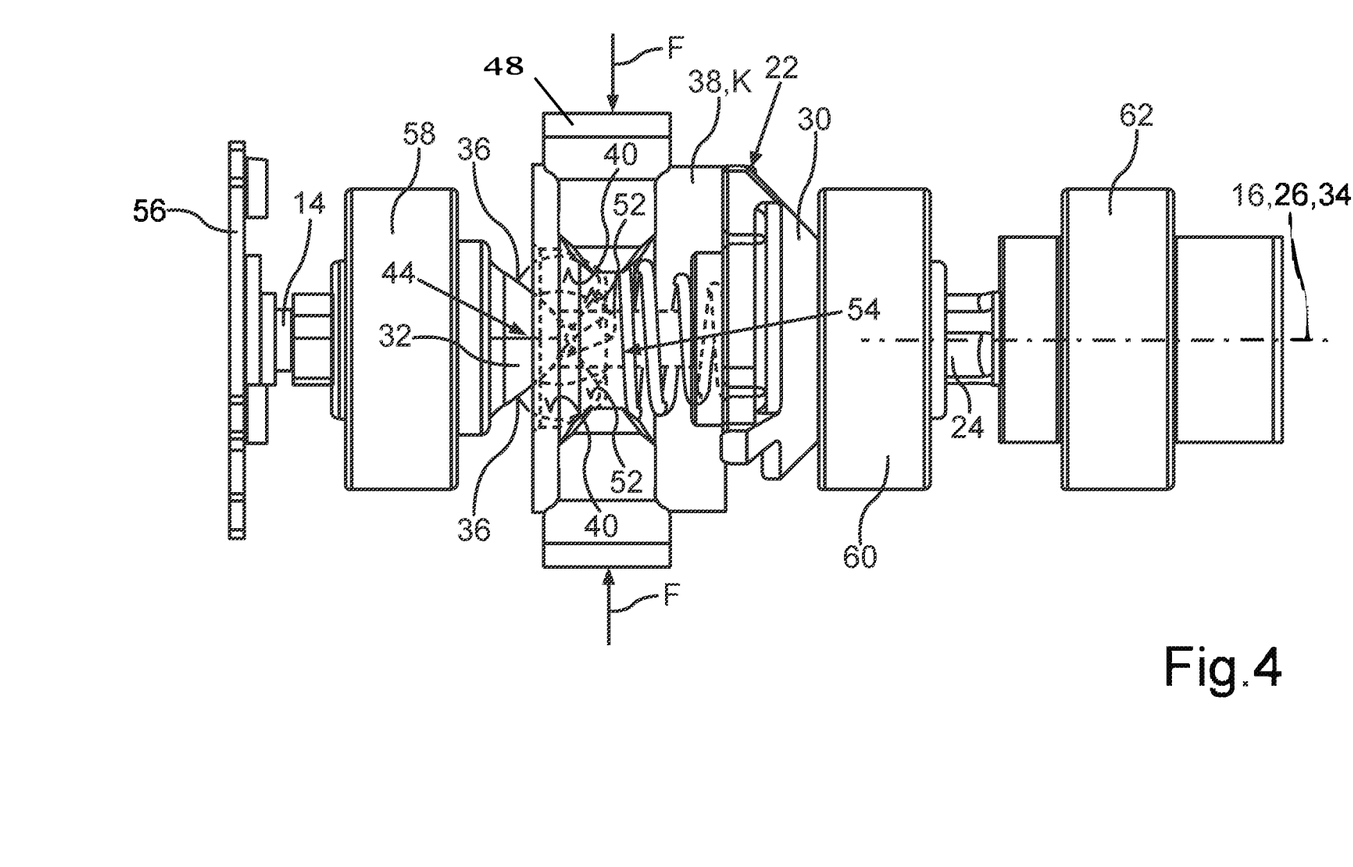
FIG. 4 shows partially a further schematic side view of the door drive.
Figure 5:
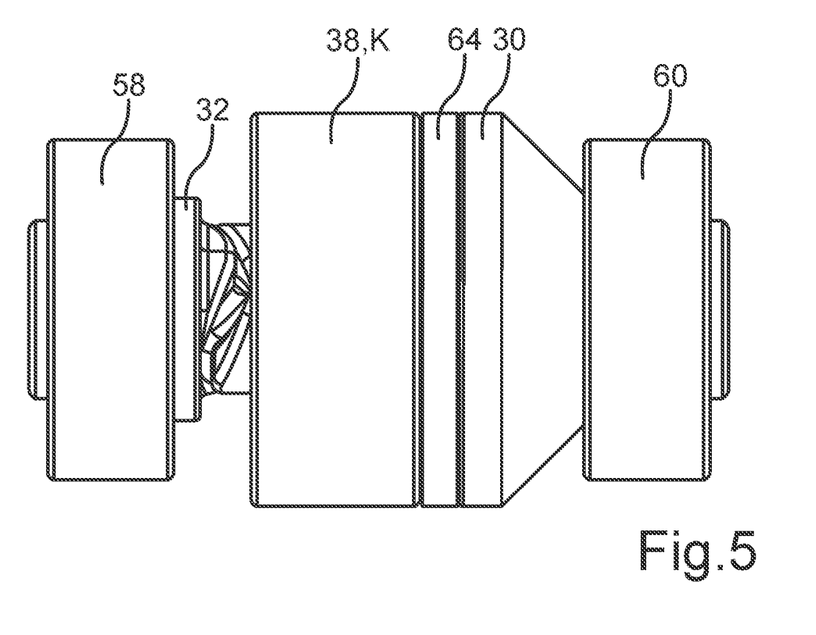
FIG. 5 shows partially a schematic side view of the door drive according to a second embodiment.

Now, in order to be able to particularly advantageously and in particular manually move the door, the clutch 22 comprises—as is particularly well apparent in synopsis with FIGS. 3 and 4—a catch element 30, which is for example at least indirectly rotationally fixedly connected to the threaded spindle 24. In addition, the clutch 22 comprises an actuating element 32, which is drivable by the drive shaft 14 by rotating the drive shaft 14 and thereby rotatable around an actuation rotational axis 34 in relation to the housing 18. Therein, the actuation rotational axis 34 presently coincides with the shaft rotational axis 16 and with the spindle rotational axis 26. In addition, the actuating element 32 comprises first actuation areas 36, which for example extend obliquely to the actuation rotational axis 34 and/or helically wind around the actuation rotational axis 34. Therefore, the actuating element 32 is for example also referred to as screw adjuster.

Moreover, the clutch 22 comprises a clutch element 38, which comprises second actuation areas 40 corresponding to the respective first actuation areas 36. It is apparent from the Figs. that the catch element 30 and the clutch element 38 are formed as disks such that the catch element 30 is also referred to as catch disk and the clutch element 38 is also referred to as clutch disk.

In addition, the clutch element 38 is translationally movable and thus shiftable between at least a decoupling position E illustrated in FIG. 3 and at least a coupling position K for example illustrated in FIG. 4 along the actuation rotational axis 34 in relation to the catch element 30 and in relation to the housing 18. In the decoupling position E, the clutch element 38 is decoupled from the catch element 30 such that torques cannot be transmitted between the clutch element 38 and the catch element 30. In the coupling position K, the clutch element 38 is coupled to the catch element 30 in torque transferring manner. In the first embodiment shown in FIGS. 1 to 4, the clutch element 38 and the catch element 30 are form-fit connected to each other in torque transferring manner in the coupling position K such that torques extending around the actuation rotational axis 34 can be transferred between the clutch element 38 and the catch element 30. It is particularly well apparent from a synopsis of FIGS. 3 and 4 that a relative rotation between the actuating element 32 and the clutch element 38 capable of being effected or effected by rotating the drive shaft 14 can be converted into a translational movement or shift of the clutch element 38 from the decoupling position E into the coupling position K taking place along the actuation rotational axis 34, in relation to the catch element 30, in relation to the actuating element 32, in relation to the housing and in the direction of the catch element 30 by means of the actuation areas 36 and 40.

Therein, the clutch element 38 located in the coupling position K is drivable by rotating the actuating element 32 and thereby rotatable together with the actuating element 32 around the actuation rotational axis 34 in relation to the housing 18. By rotating the clutch element 38 located in the coupling position K, the catch element 30 and the threaded spindle 24 via the catch element 30 are drivable and thereby rotatable around the spindle rotational axis 26 and the actuation rotational axis 34, respectively, in relation to the housing 18. For example, the actuation areas 36 and 40 extend in respective planes, which extend obliquely to the actuation rotational axis 34. Hereby, it is in particular to be understood that a respective plane tangent to the respective actuation area 36 and 40, respectively, for example extends obliquely to the actuation rotational axis 34. Thereby, at least one force or force component, the direction of action of which extends parallel to the actuation rotational axis 34 and points in the direction of the catch element 30, results for example from a torque, by means of which the actuating element 32 is rotated around the actuation rotational axis 34 in relation to the housing 18, while the clutch element 38 is still in the decoupling position E. By means of this force component, the clutch element 38 first located in the decoupling position E is moved from the decoupling position E into the coupling position K. A further shift of the clutch element 38 from the coupling position K away from the actuating element 32 is avoided in that the clutch element 38 is at least indirectly, in particular directly, supported on the catch element 30 in a support direction pointing away from the actuating element 32 and coinciding with the actuation rotational axis 34 or extending parallel to the actuation rotational axis 34. Thus, the catch element 30 prevents further shifts of the clutch element 38 from the coupling position K away from the actuating element 32.

The actuation areas 36 and 40 already overlap in the decoupling position E in circumferential direction extending around the actuation rotational axis 34 and for example illustrated in FIG. 2 by a double arrow 42. Therein, the actuation areas 40 of the clutch element 38 for example bound a receptacle 44, with which the actuation areas 36 engage both in the decoupling position E and in the coupling position K. Since the clutch element 38 cannot further shift from the coupling position K away from the actuating element 32, the clutch element 38 located in the coupling position K is rotated together with the actuating element 32 and thus rotated around the actuation rotational axis 34 in relation to the housing 18 if the actuating element 32 is rotated around the actuation rotational axis 34 in relation to the housing 18, while the clutch element 38 is in the coupling position K. As a result, the catch element 30 and the threaded spindle 24 via it are also rotated around the actuation rotational axis 34 in relation to the housing 18, whereby the door is moved in relation to the housing element.

It is particularly well apparent from FIG. 3 that the door drive 10 comprises a spring element 46 formed as a mechanical spring, which is at least indirectly, in particular directly, supported on the clutch element 38 on the one hand and at least indirectly, in particular directly, supported on the catch element 30 on the other hand along the actuation rotational axis 34. By moving the clutch element 38 from the decoupling position E into the coupling position K, the spring element 46 is tensioned, in particular compressed. Thereby, the spring element 46 provides a spring force at least in the coupling position K, which at least indirectly acts on the clutch element 38 along the actuation rotational axis. In particular by means of the previously mentioned torque exerted on the actuating element 32, the clutch element 38 is retained in the coupling position K against the spring force. If exerting the torque on the actuating element 32 is terminated, thus, the spring element 46 can for example at least partially relax. As a result, the clutch element 38 is moved back, in particular pressed back, from the coupling position K into the decoupling position E by means of the spring element 46, that is by means of the spring force provided by the spring element 46. Since the movement of the clutch element 38 from the coupling position K into the decoupling position E is also referred to as opening the clutch 22, the spring element 46 is also referred to as opening spring.

In order to secure the relative rotation between the clutch element 38 first located in the decoupling position E and the actuating element 32 and the shift of the clutch element 38 from the decoupling position E into the coupling position K resulting from it, the door drive 10 comprises brake elements 48 formed separately from the clutch element 38 and separately from the housing 18, also referred to as brake shoes. The respective brake element 48 is secured against a rotation taking place around the actuation rotational axis 34 and in relation to the housing 18. Hereto, the respective brake element 48 is for example coupled to the housing 18 via a spring 51 for example formed as a leaf spring and apparent from FIG. 2, in particular such that the respective spring 51 secures the respective brake element 48 against a rotation taking place around the actuation rotational axis 34 and in relation to the housing 18. However, the respective spring 51 preferably formed as a leaf spring provides a force F apparent from FIG. 3 and in particular formed as a spring force, which acts obliquely or preferably perpendicularly to the actuation rotational axis 34 and therein in the direction of the clutch element 38. By means of the respective force F, the respective brake element 48 is kept in, in particular direct, contact with the clutch element 38. Hereby, the clutch element 38 is braked against the housing 18 with respect to the rotation thereof taking place in relation to the housing 18 by means of the respective brake element 48.

The respective brake element 48 comprises at least one or else multiple, conical first surfaces 50. The clutch element 38 comprises at least one or else multiple, conical second surfaces 52. Therein, the respective first conical surface 50 directly abuts on the respective second conical surface 52 such that the respective conical surfaces 50 and 52 directly contact each other. Thus, the conical surfaces 50 and 52 act as friction cones, by means of which an advantageous deceleration of the clutch element 38 with respect to the rotation thereof taking place around the actuation rotational axis 34 in relation to the housing 18 can be realized on the one hand. On the other hand, by the use of the friction cones, excessive deceleration of the clutch element 38 with respect to the shift thereof extending along the actuation rotational axis 34 and taking place in relation to the housing 18 can be avoided. Thus, a desired relative rotation between the actuating element 32 and the clutch element 38 can be ensured on the one hand. On the other hand, it can be avoided that the brake elements 48 and the deceleration of the clutch element 38 provided by the brake elements, respectively, are excessively opposite to the shift of the clutch element 38 between the decoupling position E and the coupling position K. Therein, the respective brake element 48 is shiftable along the actuation rotational axis 34 together with the clutch element 38 in relation to the housing 18. Herein, the respective brake element 48 for example slides on the respective spring 51 and along the respective spring 51.

It is apparent from FIG. 4 that the conical surfaces 52 of the clutch element 38 bound a recess 54 for example formed as a groove, in particular as an annular groove, which for example completely circumferentially and thus uninterrupted extends in circumferential direction of the clutch element 38. Therein, the brake elements 48 engage with the recess 54 such that the conical surfaces 50 are arranged in the recess 54 and thus engage with the recess 54. A motor flange 56 is additionally apparent from the Figs., via which the drive motor 12 as well as optionally the transmission 20 are for example connected to the housing 18 and in particular rotationally fixedly supported on or fixed to the housing 18. In addition, bearings 58 and 60 spaced from each other in axial direction of the drive motor 12 and for example formed as rolling bearings are provided, wherein the clutch element 38 and the catch element 30 are arranged in axial direction between the bearings 58 and 60. By means of the bearings 58 and 60, the clutch 22 is for example supported on the housing 18 in particular in radial direction and in axial direction. In particular, the bearings 58 and 60 limit a or the movement of the clutch element 38 along the actuation rotational axis 34 in the direction of the actuating element 32 or of the drive motor 12 as well as in opposite direction and thus in the direction of the catch element 30 or the threaded spindle 24.

It is apparent from FIG. 3 that the door drive 10 moreover comprises a further bearing 62 functioning as a spindle bearing, by means of which the threaded spindle 24 is for example supported on the housing 18 in radial direction and/or in axial direction. While the catch element 30 and the clutch element 38 cooperate in form-fit manner and thus are coupled to each other in form-fit manner in torque transferring manner in the coupling position K in the first embodiment shown in FIGS. 1 to 4, FIG. 5 shows a second embodiment, in which the catch element 30 and the clutch element 38 cooperate in particular exclusively in force-fit or frictionally engaged manner and thus are coupled to each other in particular exclusively in frictionally engaged or force-fit manner in torque transferring manner in the coupling position K. Hereto, a clutch friction lining 64 is for example provided, which is for example retained on the catch element 30 or else on the clutch element 38. By means of the clutch friction lining 64, particularly high torques can be transferred between the catch element 30 and the clutch element 38 in the coupling position K.

For example, in order to move the door from the first position into the second position, the actuating element 32 is for example rotated around the actuation rotational axis 34 in a first rotational direction by means of the drive motor 12. This is for example effected, that is initiated or caused, by a corresponding operation of a human user, that is a person. For example, to ensure that the opening spring can shift back, in particular press back, the clutch element 38 from the coupling position K into the decoupling position E, after the door has been moved into the second position, the actuating element 32 is for example rotated by means of the drive motor 12 in automatic manner, that is without an operation of the door drive 10 effected by a person, in a second rotational direction opposite to the first rotational direction around the actuation rotational axis 34 in relation to the housing 18 and thus rotated back, after the door has been moved into the second position, and without the door being, in particular excessively, moved out of the second position. As a result, the clutch element 38 can be securely moved into the decoupling position E, whereupon the person can for example manually pivot the door without therein driving the drive motor 12. As a result, a particularly advantageous movement or actuation of the door can be ensured.

The invention claimed is:
1. A door drive for a door, the door drive comprising:
a drive motor,
a drive shaft drivable and thereby rotatable by the drive motor,
a clutch,
a housing, and
a threaded spindle which is drivable and thereby rotatable by the drive shaft via the clutch, wherein
the clutch comprises:
a catch element,
an actuating element which, by rotating the drive shaft, is drivable and thereby rotatable around an actuation rotational axis by the drive shaft, the actuating element comprising at least one first actuation area, and
a clutch element which comprises at least one second actuation area corresponding to the first actuation area, wherein the clutch element is translationally movable along the actuation rotational axis relative to the catch element between at least one decoupling position in which the clutch element is decoupled from the catch element, and at least one coupling position in which the clutch element is coupled to the catch element, and wherein a relative rotation between the actuating element and the clutch element, the relative rotation being effectable by rotating the drive shaft, can be converted, by the actuation areas, into a translational movement of the clutch element from the decoupling position into the coupling position, the translational movement taking place along the actuation rotational axis, relative to the catch element, relative to the actuating element and in the direction of the catch element;
wherein the clutch element is rotatable in relation to the housing and translationally movable between the coupling position and the decoupling position, wherein at least one brake element formed separately from the clutch element is provided, and wherein by the brake element the clutch element can be braked against the housing at least with respect to the clutch element's rotation taking place in relation to the housing;
wherein at least one first surface of the brake element directly contacts at least one second surface of the clutch element.

2. The door drive according to claim 1,
wherein
the clutch element located in the coupling position is, by rotating the actuating element, drivable and thereby rotatable together with the actuating element, wherein by rotating the clutch element located in the coupling position the catch element and, via the catch element, the threaded spindle are drivable and thereby rotatable by the clutch element.

3. The door drive according to claim 1,
wherein
the actuation areas extend in a respective plane which extends obliquely to the actuation rotational axis.

4. The door drive according to claim 1,
wherein
the actuation areas, in the decoupling position, mutually overlap in the circumferential direction extending around the actuation rotational axis.

5. The door drive according to claim 1,
wherein
one of the actuation areas at least partially bounds a receptacle with which the other actuation area, at least in the decoupling position, engages.

6. The door drive according to claim 1,
wherein
at least one spring element which can be tensioned by moving the clutch element from the decoupling position into the coupling position, and thereby provides, at least in the coupling position, a spring force at least indirectly acting on the clutch element, wherein by the spring force a movement of the clutch element from the coupling position into the decoupling position can be effected.

7. The door drive according to claim 1,
wherein
the surfaces are conically formed and/or extend in a respective plane extending obliquely to the actuation rotational axis.

8. The door drive according to claim 1,
wherein
one of the surfaces at least partially bounds a recess with which the other surface engages.

9. The door drive according to claim 1,
wherein
the brake element is formed of a first material and the clutch element is formed of a second material different from the first material.

10. The door drive according to claim 9,
wherein
the brake element is formed of a plastic and the clutch element is formed of a metallic material.

11. The door drive according to claim 10,
wherein
the brake element is formed of a fiber-reinforced plastic.

12. The door drive according to claim 1,
wherein
the clutch element and the catch element cooperate in at least one of a form-fit and force-fit manner and are thereby coupled to each other in the coupling position.

13. A device comprising:
a housing element,
a door hingedly retained on the housing element and movable in relation to the housing element, and
at least one door drive according to claim 1,
wherein the door is drivable by the door drive and thereby movable in relation to the housing element.

14. A method of operating a door drive of a door, the method comprising:
driving the door by a door drive, and
moving the door from a first position into a second position in relation to a housing element,
wherein the door drive comprises:
a drive motor,
a drive shaft which, in driving the door, is driven and thereby rotated by the drive motor,
a clutch, and
a threaded spindle which, in driving the door, is driven and thereby rotated by the drive shaft via the clutch whereby the door is driven by the drive motor via the threaded spindle, the clutch and the drive shaft,
wherein
the clutch comprises:
a catch element,
an actuating element which, by rotating the drive shaft, is driven and thereby rotated around an actuation rotational axis by the drive shaft, the actuating element comprising at least one first actuation area, and
a clutch element which comprises at least one second actuation area corresponding to the first actuation area, wherein the clutch element is translationally movable along the actuation rotational axis relative to the catch element between at least one decoupling position in which the clutch element is decoupled from the catch element, and at least one coupling position in which the clutch element is coupled to the catch element, and wherein a relative rotation between the actuating element and the clutch element, the relative rotation being effected by rotating the drive shaft, is converted, by the actuation areas, into a translational movement of the clutch element from the decoupling position into the coupling position, the translational movement taking place along the actuation rotational axis, relative to the catch element, relative to the actuating element and in the direction of the catch element;

wherein the clutch element is rotatable in relation to the housing and translationally movable between the coupling position and the decoupling position, wherein at least one brake element formed separately from the clutch element is provided, and wherein by the brake element the clutch element can be braked against the housing at least with respect to the clutch element's rotation taking place in relation to the housing;

wherein at least one first surface of the brake element directly contacts at least one second surface of the clutch element.

15. The method according to claim 14, wherein for moving the door into the second position, the actuating element, via the drive shaft by the drive motor, is rotated in a first rotational direction, wherein, after moving the door into the second position, the actuating element, via the drive shaft by the drive motor is rotated back a bit in a second rotational direction opposite to the first rotational direction in such a way that a movement of the door out of the second position is omitted or the door is moved into an intermediate position located between the first position and the second position and closer to the second position than to the first position.

* * * * *